United States Patent
Chen (10) Patent No.: US 10,025,134 B2
(45) Date of Patent: Jul. 17, 2018

(54) LIQUID CRYSTAL LENS AND MANUFACTURING METHODS THEREOF, MANUFACTURING APPARATUS THEREFOR AND 3D DISPLAY DEVICE

(71) Applicant: BOE Technology Group Co., Ltd., Beijing (CN)

(72) Inventor: Juan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 274 days.

(21) Appl. No.: 14/012,544

(22) Filed: Aug. 28, 2013

(65) Prior Publication Data

US 2014/0071393 A1 Mar. 13, 2014

(30) Foreign Application Priority Data

Sep. 13, 2012 (CN) .......................... 2012 1 0340030

(51) Int. Cl.
*G02F 1/1335* (2006.01)
*G02F 1/29* (2006.01)
*G02B 27/22* (2018.01)

(52) U.S. Cl.
CPC ....... *G02F 1/133526* (2013.01); *G02B 27/22* (2013.01); *G02F 1/29* (2013.01); *G02F 2001/294* (2013.01)

(58) Field of Classification Search
CPC .............................................. G02F 1/133526
See application file for complete search history.

(56) References Cited

U.S. PATENT DOCUMENTS

| | | | | |
|---|---|---|---|---|
| 5,744,059 A | * | 4/1998 | Yamashita | C09K 19/34 252/299.01 |
| 2005/0234693 A1 | * | 10/2005 | Sasabayashi | G06F 19/706 703/13 |
| 2011/0170039 A1 | * | 7/2011 | Bos | G02F 1/133788 349/88 |

(Continued)

FOREIGN PATENT DOCUMENTS

CN 102650792 A 8/2012

OTHER PUBLICATIONS

English abstract of CN102650792A; 1 page.
(Continued)

*Primary Examiner* — Edmond Lau
(74) *Attorney, Agent, or Firm* — Ladas & Parry LLP (57) ABSTRACT

Embodiments of the present invention provide a liquid crystal lens, a manufacturing method thereof, a manufacturing apparatus and a 3D display device. The manufacturing method of a liquid crystal lens, comprising: obtaining an actual effective refractive index profile of a liquid crystal layer by simulating, and the liquid crystal layer having an initial pretilt angle; determining a difference region in which a difference exists between a predefined standard pretilt angle and the initial pretilt angle of liquid crystal in the liquid crystal layer and a non-difference region, according to standard and actual effective refractive index profiles; simulating an orientation of the liquid crystal in the difference region of the liquid crystal lens, and determining the standard pretilt angle of the liquid crystal in the difference region; and irradiating the liquid crystal in the liquid crystal lens for alignment.

8 Claims, 7 Drawing Sheets

(56) References Cited

U.S. PATENT DOCUMENTS

| | | | |
|---|---|---|---|
| 2011/0175906 A1* | 7/2011 | Zheng | H04N 13/0404 |
| | | | 345/419 |
| 2012/0162592 A1* | 6/2012 | Takagi | G02B 27/2214 |
| | | | 349/139 |
| 2013/0128201 A1* | 5/2013 | Noma | G02F 1/133753 |
| | | | 349/123 |
| 2014/0071393 A1 | 3/2014 | Chen | |

OTHER PUBLICATIONS

First Office Action (Chinese language) issued by the Chinese Patent Office for Chinese Patent Application No. 201210340030.8, dated Feb. 3, 2015; eight (8) pages.
English translation of First Office Action for Chinese Patent Application No. 201210340030.8, dated Feb. 3, 2015; eight (8) pages.
Second Chinese Office Action Appln. No. 201210340030.8; dated Aug. 5, 2015.
Third Chinese Office Action dated Feb. 16, 2016; Appln. No. 201210340030.8.

* cited by examiner

LIQUID CRYSTAL LENS AND MANUFACTURING METHODS THEREOF, MANUFACTURING APPARATUS THEREFOR AND 3D DISPLAY DEVICE

CROSS REFERENCE TO RELATED APPLICATIONS

This application claims priority from Chinese National Application No. 201210340030.8 filed on Sep. 13, 2012, the contents of which are incorporated herein by reference.

TECHNICAL FIELD

Embodiments of the present invention relate to a liquid crystal lens, a manufacturing method thereof, a manufacturing apparatus therefor and a 3D display device.

BACKGROUND

A naked-eye 3D technology, that is, a technology for watching a 3D image without glasses, has its greatest advantage in getting rid of constraint of the glasses. At present, the naked-eye 3D technology can be divided into three types: a parallax light-shielding plate type, a lenticular lens type, and a directional backlight type. Among them, the lenticular lens 3D technology comprises a liquid crystal lens technology.

A liquid crystal lens is achieved by driving a liquid crystal layer with an electric field; the more an actual effective refractive index profile of the liquid crystal layer of the liquid crystal lens comes close to a standard effective refractive index profile, the better the display effect is; the control to the actual effective refractive index of the liquid crystal layer of the liquid crystal lens determines the imaging quality of the liquid crystal lens. So far, an effective refractive index profile of the liquid crystal lens is mainly adjusted through a method which regulates an electrode structure of the liquid crystal lens, but the effect thereof is poor.

SUMMARY

Embodiments of the present invention provide a liquid crystal lens, a manufacturing method thereof, a manufacturing apparatus therefor and a 3D display device, which can effectively adjust an actual effective refractive index profile of a liquid crystal layer, without changing an electrode structure of the liquid crystal lens.

In one aspect, a manufacturing method of a liquid crystal lens is provided, comprising: obtaining an actual effective refractive index profile of a liquid crystal layer by simulating, and the liquid crystal layer having an initial pretilt angle; determining a difference region in which a difference exists between a predefined standard pretilt angle and the initial pretilt angle of liquid crystal in the liquid crystal layer and a non-difference region in which a difference does not exist between the predefined standard pretilt angle and the initial pretilt angle of the liquid crystal in the liquid crystal layer, according to a standard effective refractive index profile and the actual effective refractive index profile of the liquid crystal layer; simulating an orientation of the liquid crystal in the difference region of the liquid crystal lens, and when the actual effective refractive index profile of the liquid crystal layer obtained by the simulating conforms to the standard effective refractive index profile of the liquid crystal layer, determining the standard pretilt angle of the liquid crystal in the difference region; and irradiating the liquid crystal in the liquid crystal lens for alignment, so as to make the liquid crystal in the difference region have the standard pretilt angle and the liquid crystal in the non-difference region have the initial pretilt angle, so that the actual effective refractive index profile of the liquid crystal layer to be consistent with the effective refractive index profile of the liquid crystal layer.

In another aspect, there is provided a manufacturing apparatus for a liquid crystal lens, comprising: a processing unit, used to: obtaining an actual effective refractive index profile of a liquid crystal layer by simulating, and the liquid crystal layer having an initial pretilt angle; determining a difference region in which a difference exists between a predefined standard pretilt angle and the initial pretilt angle of liquid crystal in the liquid crystal layer and a non-difference region in which a difference does not exist between the predefined standard pretilt angle and the initial pretilt angle of the liquid crystal in the liquid crystal layer, according to a standard effective refractive index profile and the actual effective refractive index profile of the liquid crystal layer; and simulating an orientation of the liquid crystal in the difference region of the liquid crystal lens, and when the actual effective refractive index profile of the liquid crystal layer obtained by the simulating conforms to the standard effective refractive index profile of the liquid crystal layer, determining the standard pretilt angle of the liquid crystal in the difference region; a voltage applying unit, used to: applying a deflection voltage to the liquid crystal layer to deflect it to the standard pretilt angle or applying a deflection voltage to the liquid crystal layer to deflect the liquid crystal layer to the initial pretilt angle or applying an operating voltage to the liquid crystal layer by powering on a first transparent electrode and a second transparent electrode of the liquid crystal lens; a light-shielding plate for shielding the liquid crystal in the difference region or the non-difference region; a light-irradiation unit, for irradiating the light-shielding plate.

In yet another aspect, there is provided a liquid crystal lens, comprising: a first transparent electrode, located on an inner surface of an upper substrate of the liquid crystal lens; a second transparent electrode, located on an inner surface of an lower substrate of the liquid crystal lens and spaced apart from the first transparent electrode; alignment layers, located on a surface of the first transparent electrode and a surface of the second transparent electrode, and being aligned by using light irradiation; a liquid crystal layer, located between the first transparent electrode and the second transparent electrode, wherein when powering on the first transparent electrode and the second transparent electrode, the liquid crystal layer comprises difference regions with a standard pretilt angle and non-difference regions with an initial pretilt angle to make an actual effective refractive index profile of the liquid crystal layer being consistent with a standard effective refractive index profile of the liquid crystal layer.

In yet another aspect, a 3D display device comprising the above-mentioned liquid crystal lens is provided.

With the liquid crystal lens, the manufacturing method thereof, the manufacturing apparatus therefore and the 3D display device according to embodiments of the present invention, the liquid crystal lens is manufactured by obtaining an actual effective refractive index profile of a liquid crystal layer by simulating, and the liquid crystal layer having an initial pretilt angle; determining a difference region in which a difference exists between a predefined standard pretilt angle and the initial pretilt angle of liquid crystal in the liquid crystal layer and a non-difference region in which a difference does not exist between the predefined standard pretilt angle and the initial pretilt angle of the liquid crystal in the liquid crystal layer, according to a standard effective refractive index profile and the actual effective refractive index profile of the liquid crystal layer; simulating an orientation of the liquid crystal in the difference region of the liquid crystal lens, and when the actual effective refractive index profile of the liquid crystal layer obtained by the simulating conforms to the standard effective refractive index profile of the liquid crystal layer, determining the standard pretilt angle of the liquid crystal in the difference region; irradiating the liquid crystal in the liquid crystal lens for alignment, so as to make the liquid crystal in the difference region have the standard pretilt angle and the liquid crystal in the non-difference region have the initial pretilt angle, so that the actual effective refractive index profile of the liquid crystal layer to be consistent with the effective refractive index profile of the liquid crystal layer. Thus, by aligning an alignment layer of the liquid crystal lens to make an orientation of liquid crystal in difference regions being up to a standard pretilt angle, an actual effective refractive index profile of the entire liquid crystal layer conforms to a standard effective refractive index profile. Therefore, it is possible to effectively adjust the actual effective refractive index profile without changing the electrode structure of the liquid crystal lens, so that left and right eye lights emitted from a display panel can be separated completely.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

A First Embodiment

Figure 1:
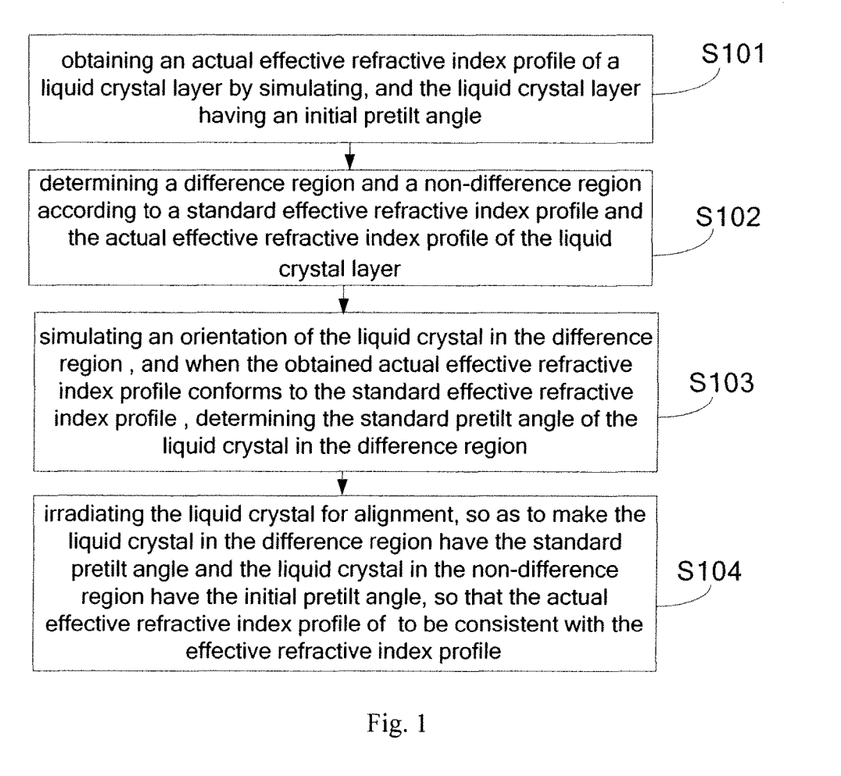
FIG. 1 is a flow chart of a manufacturing method of a liquid crystal lens according to an embodiment of the present invention.

A manufacturing method of a liquid crystal lens provided in the embodiment of the present invention is shown in FIG. 1, which comprises steps of:

S101, obtaining an actual effective refractive index profile of a liquid crystal layer by simulating, and the liquid crystal layer having an initial pretilt angle.

The liquid crystal lens comprises an alignment layer and the liquid crystal layer. The initial pretilt angle is an angle of liquid crystal in the liquid crystal lens under a 2D normal display state, which is a fixed value.

S102, determining a difference region in which a difference exists between a predefined standard pretilt angle and the initial pretilt angle of liquid crystal in the liquid crystal layer and a non-difference region in which a difference does not exist between the predefined standard pretilt angle and the initial pretilt angle of the liquid crystal in the liquid crystal layer, according to a standard effective refractive index profile and the actual effective refractive index profile of the liquid crystal layer.

It is to be noted that, the standard effective refractive index profile is a profile obtained by connecting refractive indices of the liquid crystal in various regions of the liquid crystal lens in a case that the liquid crystal lens fully separates a left-eye light and a right-eye light emitted from a display panel so as to ensure no occurrence of light crosstalk during watching of a viewer, and the standard effective refractive index profile and the actual effective refractive index can be obtained by calculation. The predefined standard pretilt angle is an angle of the liquid crystal in a case that the effective refractive index profile of the liquid crystal layer is equal to the standard effective refractive index profile.

Herein, A principle for calculating of the actual effective refractive index is as below:

First of all, as known, an expression for transmittance is:

$$T_\square = 1 - \sin^2\left(\frac{\delta}{2}\right), \text{i.e.,}$$

$\delta = 2 \arcsin \sqrt{1-T_\square}$, and at the same time, an actual deflection angle $\theta(v)$ of the liquid crystal in various regions of the liquid crystal layer after a voltage is applied thereto in the transmittance can be obtained.

Then, as also known, there is a formula:

$$\delta = 2\arcsin\sqrt{1 - T_\square} = \frac{2\pi}{\lambda}\Delta nd,$$

thus, $$\Delta n = \int_0^d n_{eff}(\theta, x, z)d_z - n_o^d = \frac{\lambda}{\pi d}\arcsin\sqrt{1 - T_\square},$$

where $n_{eff}$ is an effective refractive index of the liquid crystal.

Therefore, an expression for the effective refractive index is obtained, that is, $$\int_0^d n_{eff}(\theta, x, z)d_z = \frac{\lambda}{\pi d}\arcsin\sqrt{1-T_\square} + n_o^d,$$

where $T_\square$ is transmittance, $\delta$ is retardance, $\Delta n$ is a refractive index, d is a cell thickness, $\lambda$ is a wavelength, $n_{eff}$ is the effective refractive index, $n_0$ is a refractive index of normal light, of which the wavelength $\lambda$, the cell thickness d and the refractive index $n_0$ of normal light are all known.

The differential region in which the difference exists between the predefined standard pretilt angle and the initial pretilt angle of the liquid crystal in the liquid crystal layer is determined, according to the standard effective refractive index profile and the actual effective refractive index profile of the liquid crystal layer. By way of example, the differential region can be found, through a comparison of the actual effective refractive index profile corresponding to the actual deflection angle $\theta(v)$ of the liquid crystal with the standard effective refractive index profile corresponding to an ideal deflection angle $\theta_{ideal}$. The actual deflection angle $\theta(v)$ is an angle of the liquid crystal in the differential regions when the liquid crystal layer has the actual effective refractive index profile after a operating voltage is applied thereto, and the ideal deflection angle $\theta_{ideal}$ is an angle of the liquid crystal in the differential regions when the liquid crystal layer has the standard effective refractive index profile after a operating voltage is applied thereto.

In addition, as an expression for a single-point effective refractive index is:

$$n_{eff} = \frac{n_o n_e}{\sqrt{n_o^2\sin^2\theta(v) + n_e^2\cos^2\theta(v)}},$$

where $n_e$ is a refractive index of special light, and when $\theta(v)$ increases, the effective refractive index of the liquid crystal may decrease. Therefore, when the actual deflection angle $\theta(v)$ of the liquid crystal corresponding to the differential region after a voltage is applied is less than the ideal deflection angle $\theta_{ideal}$, by increase of the deflection angle of the liquid crystal in the differential region, the actual effective refractive index of the differential region may be decreased and thus may tend to the standard effective refractive index. When the actual effective refractive index of the differential region approximately equals to the standard effective refractive index, the current angle of the liquid crystal in the differential region is just the ideal deflection angle $\theta_{ideal}$.

S103, simulating an orientation of the liquid crystal in the difference region of the liquid crystal lens, and when the actual effective refractive index profile of the liquid crystal layer obtained by the simulating conforms to the standard effective refractive index profile of the liquid crystal layer, determining a deflection voltage being capable to make the liquid crystal layer in the difference region deflect to the standard pretilt angle.

In a practical application, a processing unit can simulate the actual effective refractive index profile of the liquid crystal layer in a certain deflection angle; accordingly, the processing unit can be utilized to regulate a deflection angle of the liquid crystal in a differential region for several times, thus the ideal deflection angle $\theta_{ideal}$ as described above can be obtained, which is most approximate to the standard effective refractive index profile, and the standard pretilt angle in embodiments of the present invention and the voltage for bringing the liquid crystal layer into this standard pretilt angle can be obtained. An exemplary simulation process comprises: applying a deflection voltage to the liquid crystal layer by simulating; shielding light for the non-difference region by simulating; irradiating the difference region by simulating; applying an operating voltage to the liquid crystal layer by simulating; comparing the actual effective refractive index profile and the standard effective refractive index profile; repeating the above-mentioned steps until the obtained actual effective refractive index profile of the liquid crystal layer conforms the standard effective refractive index profile, and thus determining the standard pretilt angle. It is to be noted that, the above-mentioned operating voltage is a voltage required when the liquid crystal operates normally, and the deflection voltage and the irradiating should be removed when applying the operating voltage to the liquid crystal layer.

S104, irradiating the liquid crystal in the liquid crystal lens for alignment, so as to make the liquid crystal in the difference region have the standard pretilt angle and the liquid crystal in the non-difference region have the initial pretilt angle, so that the actual effective refractive index profile of the liquid crystal layer to be consistent with the effective refractive index profile of the liquid crystal layer.

Through steps S101 to S103, specific positions of difference regions and non-difference regions are obtained by simulating, and the standard pretilt angle is obtained at the same time, and it is further possible to obtain a deflection voltage for the liquid crystal layer to achieve the standard pretilt angle. Therefore, during an actual alignment of the liquid crystal, the standard pretilt angle may be obtained directly according to a data obtained during simulating alignment.

Exemplarily, a first transparent electrode may be disposed on an inner surface of an upper substrate of the liquid crystal lens; a second transparent electrode may be disposed on an inner surface of a lower substrate of the liquid crystal lens; then by powering on the first transparent electrode and the second transparent electrode, a deflection voltage is applied to the liquid crystal layer being capable to make the liquid crystal layer deflect to the standard pretilt angle; shielding the liquid crystal in the non-difference region with a light-shielding plate and irradiating the liquid crystal in the difference region with a light-irradiation unit to make the liquid crystal in the difference region have the standard pretilt angle; then by powering on the first transparent electrode and the second transparent electrode, applying a deflection voltage being capable to make the liquid crystal layer deflect to the initial pretilt angle; shielding the liquid crystal in the difference region with the light-shielding plate and irradiating the liquid crystal in the non-difference region with the light-irradiation unit to make the liquid crystal in the non-difference region have the initial pretilt angle. Particularly, an order in which the above voltage applying and irradiating for the difference region and the non-difference region may be exchanged and the present invention has no limitation thereon.

In this step, the light-shielding plate is used to shield the liquid crystal in the non-difference region or difference region, and the light-irradiation unit is used to irradiate the liquid crystal in the difference region or the non-difference region.

Figure 2:
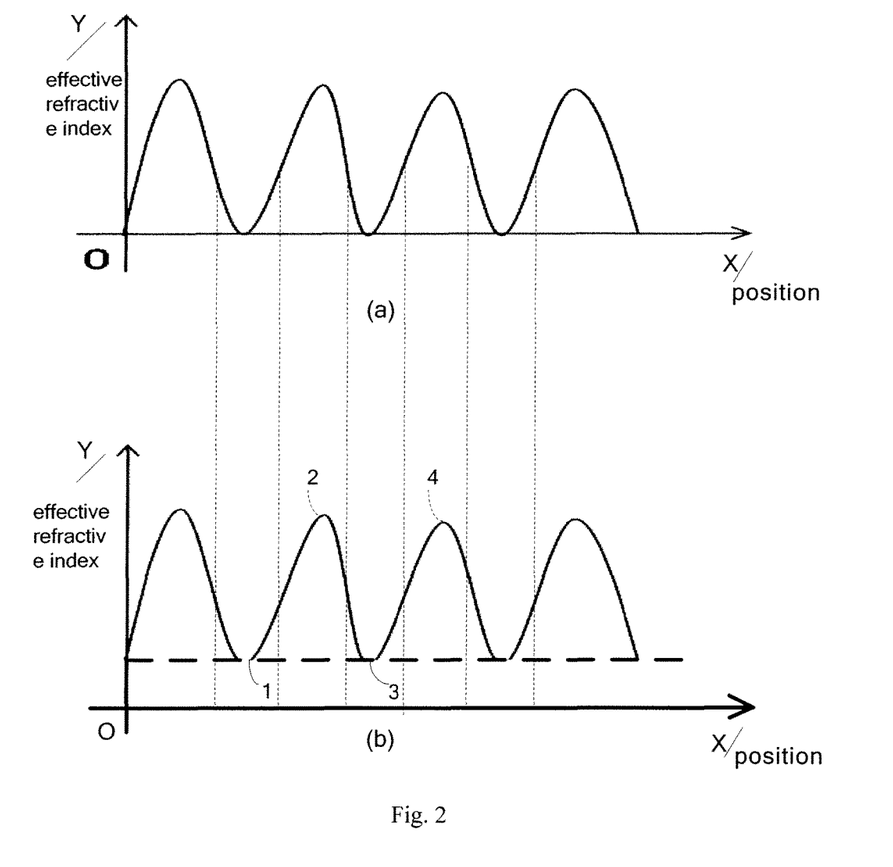
FIG. 2(a) is a standard effective refractive index profile of a liquid crystal layer shown in FIG. 3.
FIG. 2(b) is an actual effective refractive index profile of the liquid crystal layer shown in FIG. 3.

Exemplarily, the manufacturing method according to the present embodiment will be explained below with reference to FIGS. 2, 3 and 4.

Figure 3:
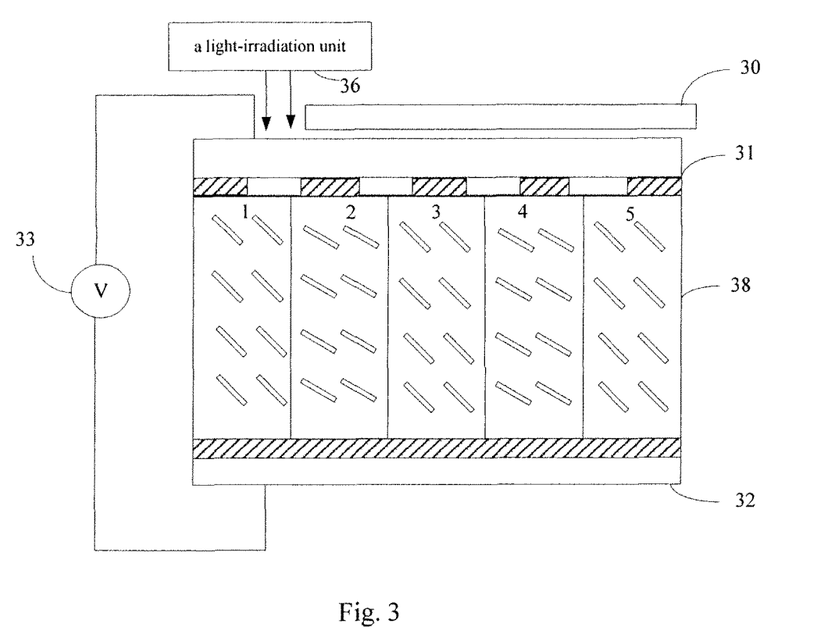
FIG. 3 is a schematic view of a manufacturing method of a liquid crystal lens according to an embodiment of the present invention.

FIG. 2(a) is the standard effective refractive index profile of the liquid crystal layer 38 in FIG. 3, in which the effective refractive index of the profile at positions corresponding to difference regions are zero. FIG. 2(b) is the actual effective refractive index profile of the liquid crystal layer 38 in FIG. 3, in which the effective refractive index of difference regions can not reaches zero. The liquid crystal layer 38 is divided into a plurality of regions according to the standard effective refractive index profile and the actual effective refractive index profile, and regions where the lowest points of the standard effective refractive index profile and the actual effective refractive index profile, i.e., the refractive indices expressed by parabolas shown in FIGS. 2(a) and FIGS. 2(b) are different are defined as the difference regions. In this embodiment, for example, the liquid crystal in the liquid crystal layer 38 is divided into 5 regions, and liquid crystal regions in the liquid crystal layer 38 in which the initial pretilt angle is different from the standard pretilt angle are determined as difference regions 1, 3 and 5 according to the difference between the standard effective refractive index profile and the actual effective refractive index profile, and other liquid crystal regions are non-difference regions 2 and 4.

As shown in FIG. 3, since the regions 1, 3 and 5 are difference regions, liquid crystal in the difference regions 1, 3 and 5 should be irradiated separately for alignment with the light-irradiation unit to make the liquid crystal in the difference regions 1, 3 and 5 have the standard pretilt angle. Taking the difference region 1 as an example, after obtaining the standard pretilt angle required by the liquid crystal in difference region 1, a deflection voltage required for the liquid crystal layer to deflect to the standard pretilt angle is applied to two spaced transparent electrode structures: the first transparent electrode 31 and the second transparent electrode 32 of the liquid crystal layer 38 with a voltage applying unit 33, and then the regions 2, 3, 4 and 5 are shielded with a light-shielding plate 30, an light-irradiation unit 36 is used to irradiate the light-shielding plate 30 to change an alignment of the alignment layer in the difference region 1, so that the liquid crystal in difference region 1 has the standard pretilt angle.

Figure 4:
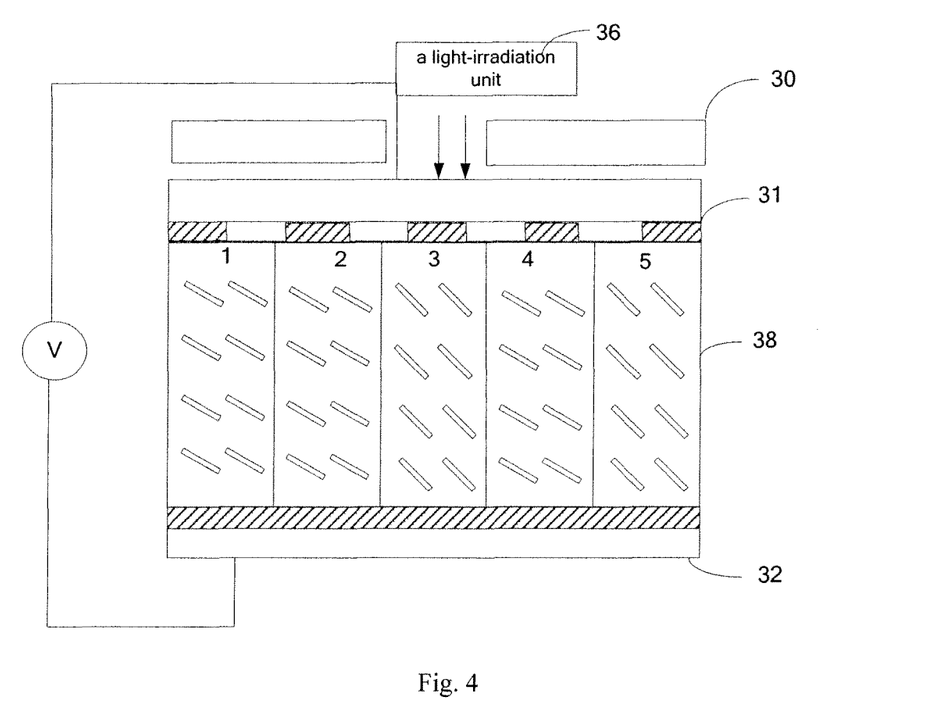
FIG. 4 is another schematic view of a manufacturing method of a liquid crystal lens according to an embodiment of the present invention.

Next, as shown in FIG. 4, the regions 1, 2, 4 and 5 are shielded with the light-shielding plate 30 and the light-shielding plate 30 is irradiated with the light-irradiation unit 36 to change an alignment of the alignment layer in the difference region 3, so that the liquid crystal in the difference region 3 has the standard pretilt angle. The aligning process for the difference region 5 is the same as the regions 1 and 3, which will not be described again. Next, the regions 1, 3, 4 and 5 are shielded with the light-shielding plate 30 and the light-shielding plate 30 is irradiated with the light-irradiation unit 36 to change an alignment of the alignment layer in the non-difference region 2, so that the liquid crystal in the non-difference region 2 has the initial pretilt angle. The aligning process for the non-difference region 4 is the same as the region 2, which will not be described again. With the above steps, orientating liquid crystal in all regions of the entire liquid crystal lens is completed.

Exemplarily, if the standard pretilt angles required for the liquid crystal in the difference regions 1, 3 and 5 are the same, it is also possible to apply a deflection voltage required for the liquid crystal layer to deflect to the standard pretilt angle to the two spaced transparent electrode structures: the first transparent electrode 31 and the second transparent electrode 32 of the liquid crystal layer 38 with the voltage applying unit 33, and then the regions 2 and 4 are shielded with the light-shielding plate 30, the light-irradiation unit 36 is used to irradiate the light-shielding plate 30 to change simultaneously alignments of the alignment layers in the difference regions 1, 3 and 5. Then, a deflection voltage required for the liquid crystal layer to deflect to the initial pretilt angle is applied to the two spaced transparent electrode structures: the first transparent electrode 31 and the second transparent electrode 32 of the liquid crystal layer 38 with the voltage applying unit 33, and then the regions 1, 3, and 5 are shielded with the light-shielding plate 30, the light-irradiation unit 36 is used to irradiate the light-shielding plate 30 to change alignments of the alignment layers in the non-difference regions 2 and 4, so that the liquid crystal in the non-difference region 2 and 4 have the initial pretilt angle.

The refractive index profile of liquid crystal layer 38 after the light-irradiation conforms to the standard effective refractive index profile shown in FIG. 2(a).

Exemplarily, the manufacturing method of the liquid crystal lens according to the present embodiment may further comprise: disposing a third electrode on the lower substrate of the liquid crystal lens, and by powering on the first transparent electrode and the third electrode, applying a deflection voltage required to deflect the liquid crystal in the difference region to the initial pretilt angle to the liquid crystal layer. In this way, when this liquid crystal lens is applied to a 3D display, a normal switching between 2D and 3D can be realized, allowing the liquid crystal layer in the liquid crystal lens have a uniform initial pretilt angle in a 2D state.

With the manufacturing method of the liquid crystal lens according to an embodiment of the present invention, by aligning the alignment layer of the liquid crystal lens, liquid crystal angle in the difference region are made to up to the standard pretilt angle, and liquid crystal angle in the non-difference region are made to up to the initial pretilt angle, so that the actual effective refractive index profile of the entire liquid crystal layer coincides with the standard effective refractive index profile. Therefore, it is possible to effectively adjust the actual effective refractive index profile without changing the electrode structure of the liquid crystal lens to make the left-eye light and the right-eye light emitted from the display panel separated completely.

It is noted that, due to limitations such as instrument and human factors, after applying voltage, the liquid crystal angle in the difference region can only infinitely approach to an ideal liquid crystal angle, and the actual effective refractive index and the standard effective refractive index can not completely coincide, and the present embodiment only explains the effect of this method under an ideal state.

A Second Embodiment

Hereafter, a corresponding manufacturing apparatus for a liquid crystal lens will be explained according to an embodiment of the present invention.

Figure 5:
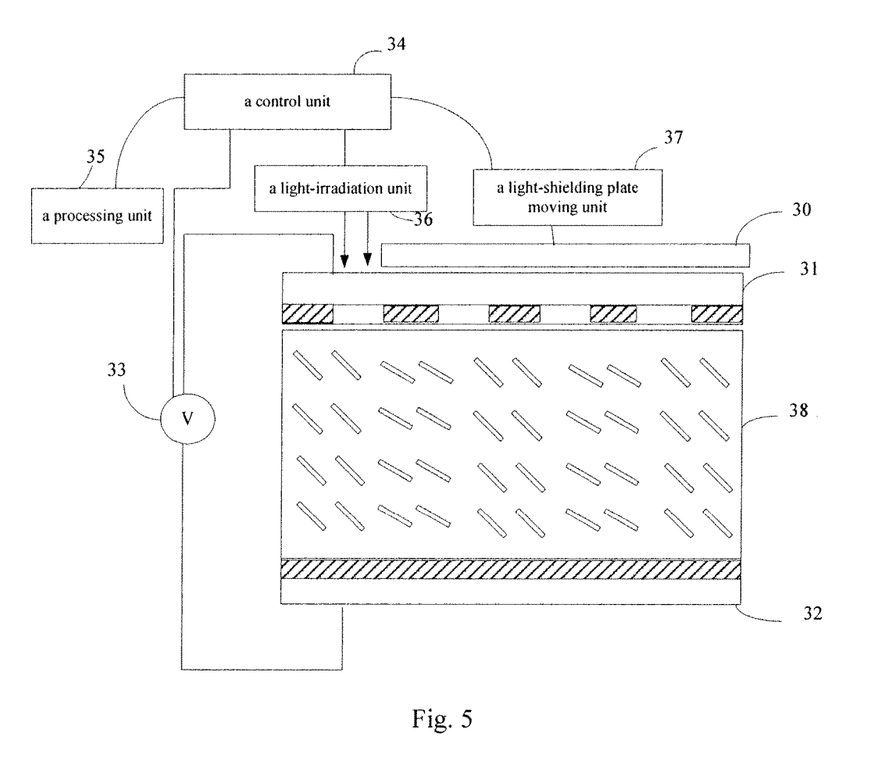
FIG. 5 is a structure schematic view of a manufacturing apparatus for a liquid crystal lens according to an embodiment of the present invention.

As shown in FIG. 5, the manufacturing apparatus for the liquid crystal lens according to the embodiment of the present invention comprises:

a processing unit 35, used to: obtaining an actual effective refractive index profile of a liquid crystal layer by simulating, and the liquid crystal layer having an initial pretilt angle; determining a difference region in which a difference exists between a predefined standard pretilt angle and the initial pretilt angle of liquid crystal in the liquid crystal layer and a non-difference region in which a difference does not exist between the predefined standard pretilt angle and the initial pretilt angle of the liquid crystal in the liquid crystal layer, according to a standard effective refractive index profile and the actual effective refractive index profile of the liquid crystal layer; and simulating an orientation of the liquid crystal in the difference region of the liquid crystal lens, and when the actual effective refractive index profile of the liquid crystal layer obtained by the simulating conforms to the standard effective refractive index profile of the liquid crystal layer, determining a deflection voltage being capable to make the liquid crystal in the difference region deflect to the standard pretilt angle.

The initial pretilt angle is an angle of the liquid crystal layer in the liquid crystal lens in an normal 2D display state, which is a fixed value.

A voltage applying unit 33, used to: applying a deflection voltage to the liquid crystal layer 38 to deflect it to the standard pretilt angle or applying a deflection voltage to the liquid crystal layer 38 to deflect the liquid crystal layer to the initial pretilt angle or applying an operating voltage to the liquid crystal layer by being connected to a first transparent electrode 31 and a second transparent electrode 32 of the liquid crystal lens, in which two voltage output terminals of the voltage applying unit 33 are connected to the two transparent electrodes, respectively.

A light-shielding plate 30, for shielding the liquid crystal in the difference region or the non-difference region. While manufacturing the liquid crystal lens, the light-shielding plate may be located above the first transparent electrode 31 on an upper end of the liquid crystal lens. Exemplarily, when irradiating the difference regions for alignment, light-transmitting regions of the light-shielding plate 30 may correspond to the difference regions of the liquid crystal layer 38, and light-shielding regions of the light-shielding plate 30 may correspond to regions other than difference regions of the liquid crystal layer 38.

A light-irradiation unit 36, for irradiating the light-shielding plate. Exemplarily, while irradiating the difference regions for alignment, light from the light-irradiation unit 36 transmits through the light-transmitting regions of the light-shielding plate 30, and is projected to the liquid crystal in difference regions through the first transparent electrode 31, for aligning the alignment layer in the difference region, making the liquid crystal in the difference region have the standard pretilt angle. While irradiating the non-difference region for alignment, light from the light-irradiation unit 36 transmits through the light-transmitting region of the light-shielding plate 30, and is projected to the liquid crystal in the non-difference regions through the first transparent electrode 31, for aligning the alignment layer in the non-difference region, making the liquid crystal in the non-difference region have the initial pretilt angle.

Figure 6:
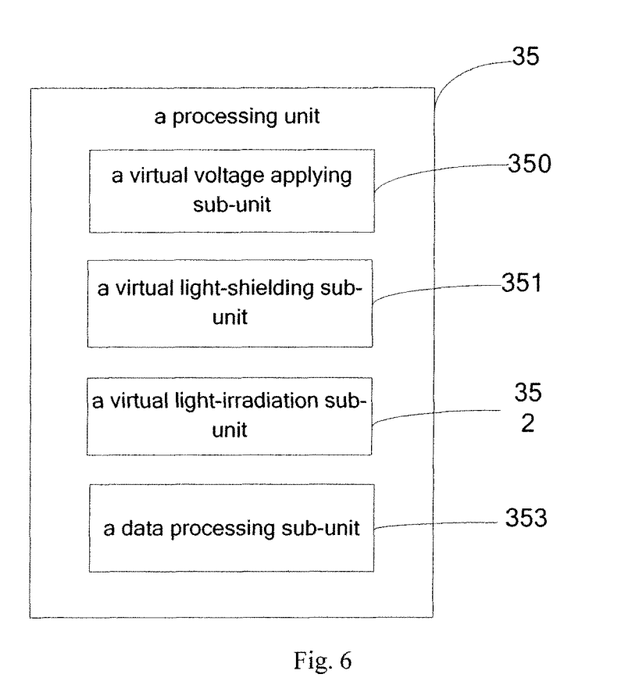
FIG. 6 is a structure schematic view of a processing unit shown in FIG. 5.

Further, as shown in FIG. 6, the processing unit 35 further comprises: a virtual voltage applying sub-unit 350, a virtual light-shielding sub-unit 351, a virtual light-irradiation sub-unit 352 and a data processing sub-unit 353.

The virtual voltage applying sub-unit 350 is for simulating to apply the deflection voltage or the operating voltage to the liquid crystal layer.

A virtual light-shielding sub-unit 351 is for simulating shielding the non-difference region.

A virtual light-irradiation sub-unit 352 is for simulating irradiating the difference region.

A data processing sub-unit 353 is for calculating and comparing the standard effective refractive index profile and the actual effective refractive index profile of the liquid crystal layer, and determining the standard pretilt angle when the actual effective refractive index profile is consistent with the standard effective refractive index profile of the liquid crystal layer.

As such, by simulating a manufacturing process of the liquid crystal lens with various virtual sub-units, corresponding data is obtained by the data processing sub-unit 353, and a calculating is performed by the data processing sub-unit 353 to provide a data reference for an actual manufacturing process.

Furthermore, as shown in FIG. 5, the manufacturing apparatus further comprises:

A light-shielding plate moving unit 37, for moving the light-shielding plate so as to make the light-transmitting region thereof to be located above the differential region or the non-difference region;

A control unit 34, connected with the processing unit 35, the voltage applying unit 33, the light-shielding plate moving unit 37 and the light-irradiation unit 36, and for controlling the voltage applying unit 33, the light-shielding plate moving unit 37 and the light-irradiation unit 36 according to the data obtained by the processing unit.

In such a way, under the control of the control unit 34, the manufacturing apparatus according to the embodiment of the present invention can directly manufacture a liquid crystal lens with a refractive index profile being close to the standard effective refractive index profile.

A Third Embodiment

Figure 7:
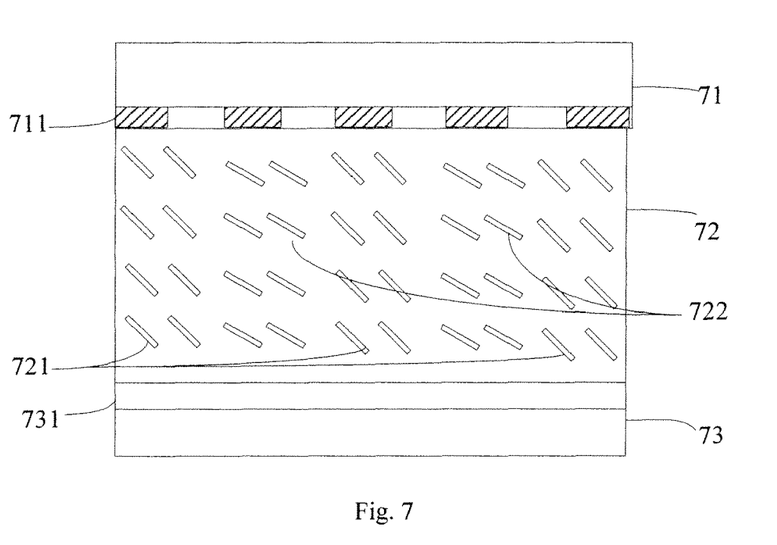
FIG. 7 is a structure schematic view of a liquid crystal lens according to an embodiment of the present invention.

As shown in FIG. 7, the liquid crystal lens provided in the embodiment of the present invention comprises: a first transparent electrode 711, located on an inner surface of an upper substrate 71 of the liquid crystal lens; a second transparent electrode 731, located on an inner surface of an lower substrate 73 of the liquid crystal lens and spaced apart from the first transparent electrode 711; alignment layers (not shown in FIG. 7), located on a surface of the first transparent electrode 711 and a surface of the second transparent electrode 731, and being aligned by using light irradiation; a liquid crystal layer 72, located between the first transparent electrode 711 and the second transparent electrode 731.

When powering on the first transparent electrode 711 and the second transparent electrode 731, the liquid crystal layer 72 comprises difference regions 721 with standard pretilt angles and non-difference regions 722 with initial pretilt angles to make an actual effective refractive index profile of the liquid crystal layer 72 conforms to the standard effective refractive index profile of the liquid crystal layer 72.

It is noted that, the first transparent electrode and the second transparent electrode may be embodied in the following three ways, specifically including: the first transparent electrode 711 comprising strip electrodes spaced apart from each other with a equal interval and being parallel to each other and the second transparent electrode 731 being an integral electrode, as shown in FIG. 7; Or, the first transparent electrode being an integral electrode and the second transparent electrode comprising strip electrodes spaced apart from each other with a equal interval and being parallel to each other; Or, the first transparent electrode comprising strip electrodes spaced apart from each other with a equal interval and being parallel to each other and the second transparent electrode comprising strip electrodes spaced apart from each other with a equal interval and being parallel to each other, wherein the first transparent electrode and the second transparent electrode overlap in a vertical direction.

Thus, by applying a voltage and irradiating for alignment, when the liquid crystal angle in the difference region is made to up to the standard pretilt angle, the liquid crystal angle in the non-difference region is made to up to the initial pretilt angle, and thus, the actual effective refractive index profile of the entire liquid crystal layer coincides with the standard effective refractive index profile. Therefore, it is possible to effectively adjust the actual effective refractive index profile without changing the electrode structure of the liquid crystal lens to make the left-eye light and the right-eye light emitted from the display panel separated completely.

Figure 8:
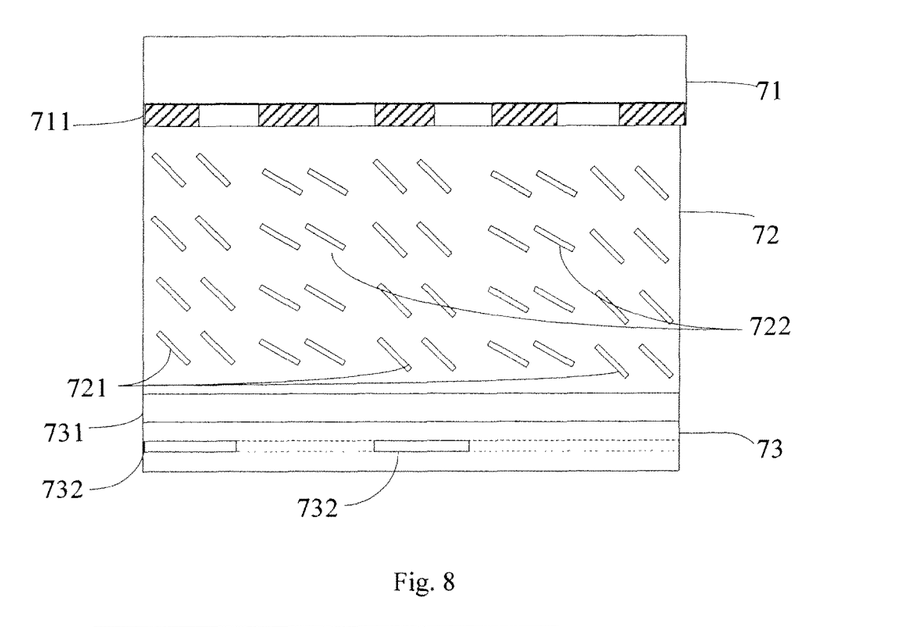
FIG. 8 is a structure schematic view of another liquid crystal lens according to an embodiment of the present invention.

Furthermore, as shown in FIG. 8, the liquid crystal lens provided in the embodiment of the present invention may further comprise: a third transparent electrode 732, located on the lower substrate 73 of the liquid crystal lens and spaced apart from the second transparent electrode 731, wherein when powering on the first transparent electrode and the third transparent electrode, the liquid crystal in the difference region of the liquid crystal layer is made to have with the initial pretilt angle.

The third transparent electrode 732 may be located at a position corresponding to a difference region 721. Of course, the third transparent electrode 732 may also be not located at the position corresponding to the difference region 721, as long as it can ensure that while performing the 2D display, the liquid crystal of the liquid crystal layer 72 is made to have the initial pretilt angle by powering on the first transparent electrode 711 and the third transparent electrode 732. Thus, liquid crystals in the difference region and the non-difference region in the liquid crystal lens have an identical tilt angle, which can ensure the uniformity of an entire image to realize a normal 2D display.

Exemplarily, the alignment layer of the liquid crystal lens is one being aligned by the light irradiation, which allows changing an alignment structure under the light irradiation, facilitating adjusting an actual effective refractive index of the liquid crystal.

Figure 9:
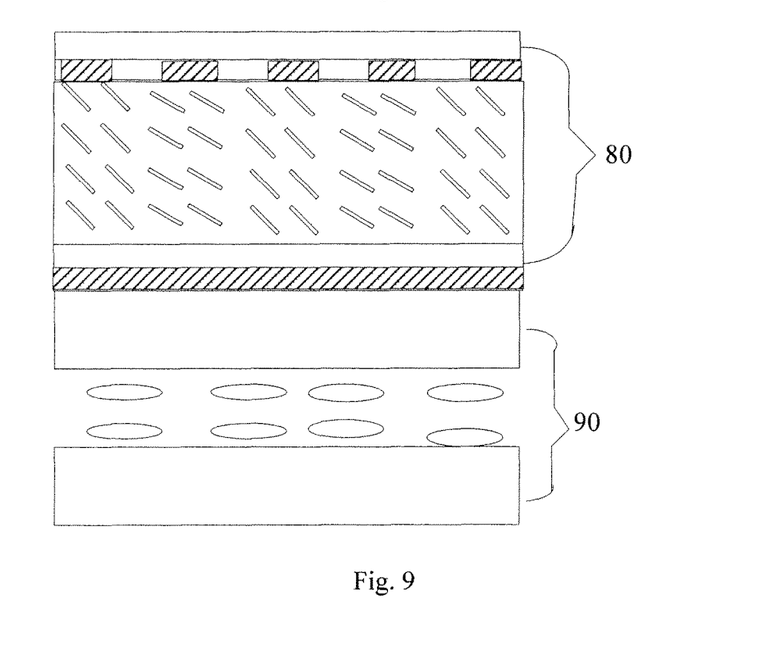
FIG. 9 is a structure schematic view of a 3D display device according to an embodiment of the present invention.

A 3D display device according to an embodiment of the present invention comprises the above-mentioned liquid crystal lens. The display device may adopt display modes such as LCD (Liquid Crystal Display), OLED (Organic Light-Emitting Diode) and plasma display. Exemplarily, as shown in FIG. 9, in this 3D display device, the liquid crystal lens 80 may be located above the liquid crystal display screen 90 in the 3D display device. Exemplarily, the liquid crystal lens may also be located between the liquid crystal screen and the backlight source.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The invention claimed is:

1. A manufacturing method of a liquid crystal lens, comprising:
   obtaining an actual effective refractive index profile of a liquid crystal layer by simulating, and the liquid crystal layer having an initial pretilt angle;
   determining difference regions in each of which a difference exists between a corresponding predefined standard pretilt angle and the initial pretilt angle of liquid crystal in the liquid crystal layer and non-difference regions in each of which a difference does not exist between a corresponding predefined standard pretilt angle and the initial pretilt angle of the liquid crystal in the liquid crystal layer, according to a standard effective refractive index profile corresponding to predefined standard pretilt angles and the actual effective refractive index profile corresponding to the initial pretilt angle of the liquid crystal layer, wherein the difference regions and the non-difference regions are alternately located in the liquid crystal layer;
   simulating an orientation of the liquid crystal in the difference regions of the liquid crystal lens, and when the actual effective refractive index profile of the liquid crystal layer obtained by the simulating conforms to the standard effective refractive index profile of the liquid crystal layer, determining deflection voltages being capable to make the liquid crystal in the difference regions deflect to standard pretilt angles; and
   irradiating the liquid crystal in the liquid crystal lens for alignment, so as to make the liquid crystal in the difference regions have the standard pretilt angles and the liquid crystal in the non-difference regions have the initial pretilt angle, so that the actual effective refractive index profile of the liquid crystal layer to be consistent with the standard effective refractive index profile of the liquid crystal layer,
   wherein the simulating the orientation of the liquid crystal in the difference regions of the liquid crystal lens, and when the actual effective refractive index profile of the liquid crystal layer obtained by the simulating conforms to the standard effective refractive index profile of the liquid crystal layer, determining the deflection voltages being capable to make the liquid crystal in the difference regions deflect to the standard pretilt angles comprises, for each difference region:
   applying a deflection voltage to the liquid crystal layer by simulating;
   shielding light for the corresponding non-difference region by simulating;
   irradiating the corresponding difference region by simulating;
   applying an operating voltage to the liquid crystal layer by simulating;
   comparing the actual effective refractive index profile and the standard effective refractive index profile; and
   repeating the above-mentioned operations until the obtained actual effective refractive index profile of the liquid crystal layer conforms to the standard effective refractive index profile, and thus determining the corresponding standard pretilt angle.

2. The manufacturing method of the liquid crystal lens according to claim 1, wherein the irradiating the liquid crystal in the liquid crystal lens for alignment, so as to make the liquid crystal in the difference regions have the standard pretilt angles and the liquid crystal hi the non-difference regions have the initial pretilt angle, so that the actual effective refractive index profile of the liquid crystal layer to be consistent with the effective refractive index profile of the liquid crystal layer comprises:
   disposing a first transparent electrode on an inner surface of an upper substrate of the liquid crystal lens;
   disposing a second transparent electrode on an inner surface of a lower substrate of the liquid crystal lens;
   by powering on the first transparent electrode and the second transparent electrode using a voltage applying unit, applying a deflection voltage being capable to make the liquid crystal layer deflect to the standard pretilt angle;
   shielding the liquid crystal in the non-difference regions with a light-shielding plate and irradiating the liquid crystal of the difference regions with a light-irradiation unit to make the liquid crystal in the difference regions have the standard pretilt angles;

by powering on the first transparent electrode and the second transparent electrode using a voltage applying unit, applying a deflection voltage being capable to make the liquid crystal layer deflect to the initial pretilt angle;

shielding the liquid crystal in the difference regions with the light-shielding plate and irradiating the liquid crystal in the non-difference regions with the light-irradiation unit to make the liquid crystal in the non-difference regions have the initial pretilt angle.

3. The manufacturing method of the liquid crystal lens according to claim 1, wherein the standard effective refractive index profile includes a profile obtained by connecting refractive indices of the liquid crystal in various regions of the liquid crystal lens in a case that the liquid crystal lens fully separates a left-eye light and a right-eye light emitted from a display panel.

4. The manufacturing method of the liquid crystal lens according to claim 1, wherein for each of the difference regions:

when an actual deflection angle of the liquid crystal corresponding to the corresponding difference region with application of the operating voltage is less than an ideal deflection angle, the actual deflection angle of the liquid crystal in the corresponding difference region is increased through adjusting the operating voltage, so that an actual effective refractive index of the corresponding difference region is decreased and approaches to a standard effective refractive index of the corresponding difference region.

5. A manufacturing apparatus for a liquid crystal lens, comprising:

a processing unit, used to: obtaining an actual effective refractive index profile of a liquid crystal layer by simulating, and the liquid crystal layer having an initial pretilt angle; determining difference regions in each of which a difference exists between a corresponding predefined standard pretilt angle and the initial pretilt angle of liquid crystal in the liquid crystal layer and non-difference regions in each of which a difference does not exist between a corresponding predefined standard pretilt angle and the initial pretilt angle of the liquid crystal in the liquid crystal layer, according to a standard effective refractive index profile corresponding to the predefined standard pretilt angles and the actual effective refractive index profile corresponding to the initial pretilt angle of the liquid crystal layer; and simulating an orientation of the liquid crystal in the difference regions of the liquid crystal lens, and when the actual effective refractive index profile of the liquid crystal layer obtained by the simulating conforms to the standard effective refractive index profile of the liquid crystal layer, determining deflection voltages being capable to make the liquid crystal in the difference regions deflect to standard pretilt angles, wherein the difference regions and the non-difference regions are alternately located in the liquid crystal layer;

a voltage applying unit, used for applying deflection voltages to the liquid crystal layer to deflect it to the standard pretilt angles or applying a deflection voltage to the liquid crystal layer to deflect the liquid crystal layer to the initial pretilt angle or applying an operating voltage to the liquid crystal layer by powering on a first transparent electrode and a second transparent electrode of the liquid crystal lens;

a light-shielding plate for shielding the liquid crystal in the difference regions or the non-difference regions; and a light-irradiation unit, for irradiating the light-shielding plate, wherein the processing unit comprises:

a virtual voltage applying sub-unit, for simulating to apply the deflection voltage or the operating voltage to the liquid crystal layer;

a virtual light-shielding sub-unit, for simulating shielding the non-difference regions;

a virtual light-irradiation sub-unit for simulating irradiating the difference regions;

a data processing sub-unit, for calculating and comparing the standard effective refractive index profile and the actual effective refractive index profile of the liquid crystal layer, and determining deflection voltages being capable to make the liquid crystal in the difference regions deflect to the standard pretilt angles when the actual effective refractive index profile is consistent with the standard effective refractive index profile of the liquid crystal layer, and wherein the processing unit simulates the orientation of the liquid crystal in the difference regions of the liquid crystal lens, and when the actual effective refractive index profile of the liquid crystal layer obtained by the simulating conforms to the standard effective refractive index profile of the liquid crystal layer, the processing unit determines deflection voltages being capable to make the liquid crystal in the difference regions deflect to the standard pretilt angles at least by:

in each of the difference regions:

applying a deflection voltage to the liquid crystal layer by simulating;

shielding light for the corresponding non-difference region by simulating;

irradiating the difference region by simulating;

applying an operating voltage to the liquid crystal layer by simulating;

comparing the actual effective refractive index profile and the standard effective refractive index profile; and repeating the above-mentioned steps until the obtained actual effective refractive index profile of the liquid crystal layer conforms the standard effective refractive index profile, and thus determining a corresponding standard pretilt angle.

6. The manufacturing apparatus for the liquid crystal lens according to claim 5, further comprises:

a light-shielding plate moving unit, for moving the light-shielding plate so as to make a light-transmitting region thereof to be located above the difference regions or the non-difference regions;

a control unit, connected with the processing unit, the voltage applying unit, the light-shielding plate moving unit and the light-irradiation unit, and for controlling the voltage applying unit according to the deflection voltage obtained by the processing unit to apply the deflection voltages to the liquid crystal layer to deflect it to the standard pretilt angles, for controlling the light-shielding plate moving unit to move the light-shielding plate so that the light-shielding plate shields the liquid crystal in the non-difference regions, and for controlling the light-irradiation unit to irradiate the liquid crystal in the difference regions to make the liquid crystal in the difference regions have the standard pretilt angles.

7. The manufacturing apparatus for the liquid crystal lens according to claim 5, wherein the standard effective refractive index profile includes a profile obtained by connecting refractive indices of the liquid crystal in various regions of the liquid crystal lens in a case that the liquid crystal lens fully separates a left-eye light and a right-eye light emitted from a display panel.

8. The manufacturing apparatus for the liquid crystal lens according to claim 5, wherein for each of the difference regions:
   when an actual deflection angle of the liquid crystal corresponding to the corresponding difference region with application of the operating voltage is less than an ideal deflection angle, the actual deflection angle of the liquid crystal in the corresponding difference region is increased through adjusting the operating voltage, so that an actual effective refractive index of the corresponding difference region is decreased and approaches to a standard effective refractive index of the corresponding difference region.

* * * * *